United States Patent [19]
Whitney et al.

[11] Patent Number: 6,053,795
[45] Date of Patent: *Apr. 25, 2000

[54] TOY HAVING IMAGE MODE AND CHANGED IMAGE MODE

[75] Inventors: Leland R. Whitney, St. Paul; Gregory D. Allen, Woodbury, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/006,580

[22] Filed: Jan. 13, 1998

[51] Int. Cl.⁷ .......................... A63H 33/22; A63H 33/26; A63H 3/52; G09F 13/00

[52] U.S. Cl. .......................... 446/219; 446/485; 446/481; 40/434; 359/501

[58] Field of Search .................... 446/219, 479, 446/480, 481, 485; 40/434; 359/501, 487, 484

[56] References Cited

U.S. PATENT DOCUMENTS

| | | |
|---|---|---|
| H1,154 | 3/1993 | Gibson, et al. . |
| 540,768 | 6/1895 | Western . |
| 1,475,430 | 11/1923 | Curwen . |
| 2,535,781 | 12/1950 | Burchell ............... 40/434 X |
| 2,763,078 | 9/1956 | Graves ................. 40/434 X |
| 3,054,204 | 9/1962 | Yates .................. 40/434 X |
| 3,100,418 | 8/1963 | Posner . |
| 3,124,639 | 3/1964 | Kahn . |
| 3,162,008 | 12/1964 | Berger et al. ........ 359/501 X |
| 3,315,391 | 4/1967 | Lane et al. ........... 40/434 X |
| 3,350,803 | 11/1967 | Stockwell ............. 40/434 X |
| 3,535,805 | 10/1970 | Peiperl ............... 40/434 X |
| 3,609,003 | 9/1971 | Siksai ................ 359/501 X |
| 3,610,729 | 10/1971 | Rogers . |
| 3,711,176 | 1/1973 | Alfrey, Jr. et al. . |
| 3,711,182 | 1/1973 | Jasgur ................ 359/501 X |
| 3,743,381 | 7/1973 | Moodie . |

(List continued on next page.)

FOREIGN PATENT DOCUMENTS

| | | |
|---|---|---|
| 1 023 998 | 2/1958 | Germany .............. 446/479 |
| 7-108084 | 4/1995 | Japan . |
| 8-164245 | 1/1996 | Japan . |
| 8-19639 | 1/1996 | Japan . |
| 888050 | 12/1981 | Russian Federation . |
| WO 95/27919 | 4/1995 | WIPO .............. G02B 27/28 |
| WO 95/17303 | 6/1995 | WIPO .............. B32B 7/02 |
| WO 95/17691 | 6/1995 | WIPO .............. G02B 5/30 |
| WO 95/17692 | 6/1995 | WIPO .............. G02B 5/30 |
| WO 95/17699 | 6/1995 | WIPO .............. G02F 1/1335 |
| WO 96/19347 | 6/1996 | WIPO .............. B32B 7/02 |
| WO 97/01440 | 1/1997 | WIPO .............. B32B 27/36 |
| WO 97/01774 | 1/1997 | WIPO .............. G02B 1/10 |
| WO 97/07653 | 2/1997 | WIPO .............. H05B 33/22 |
| WO 97/32226 | 9/1997 | WIPO .............. G02B 5/30 |

OTHER PUBLICATIONS

3M Product Brochure, "3M™ Dual Brightness Enhancement Film (DBEF)", 75–0500–2062–9, copyright 3M, 1996.

Schrenk et al., Nanolayer polymeric optical films, Tappi Journal, pp. 169–174, Jun. 1992.

Durel™ 3 Electroluminescent System, Durel Product Brochure, 26 pages, 1995.

Quantex product information from Internet website, "http://www.u.s.net/quantex/el.htm", Jul. 10, 1997, 10 pages.

*Primary Examiner*—D Neal Muir
*Attorney, Agent, or Firm*—Gregory D. Allen

[57] ABSTRACT

A toy or novelty article including an image located thereon, having a reflective "mirror" mode and a transmissive mode, such that a generally opaque material is viewable in the transmissive mode. One preferred embodiment includes a generally opaque material, a first polarizer and a second polarizer. In another aspect, a preferred embodiment, in a first orientation, the first and second polarizers interact to be reflective, and in a second orientation, the first and second polarizers are collectively translucent such that the generally opaque material is viewable therethrough.

39 Claims, 6 Drawing Sheets

U.S. PATENT DOCUMENTS

| | | |
|---|---|---|
| 3,841,730 | 10/1974 | Karelitz . |
| 3,860,036 | 1/1975 | Newman, Jr. . |
| 3,944,346 | 3/1976 | Shindler . |
| 4,066,925 | 1/1978 | Dickson . |
| 4,138,620 | 2/1979 | Dickson . |
| 4,205,846 | 6/1980 | Levine . |
| 4,356,429 | 10/1982 | Tang . |
| 4,402,510 | 9/1983 | Yokoi . |
| 4,446,305 | 5/1984 | Rogers et al. . |
| 4,491,326 | 1/1985 | Halsey, III . |
| 4,520,189 | 5/1985 | Rogers et al. . |
| 4,521,588 | 6/1985 | Rogers et al. . |
| 4,525,413 | 6/1985 | Rogers et al. . |
| 4,579,426 | 4/1986 | Onufry . |
| 4,653,843 | 3/1987 | Karelitz . |
| 4,697,890 | 10/1987 | Crookston . |
| 4,720,426 | 1/1988 | Englert et al. . |
| 4,780,643 | 10/1988 | Ellis et al. . |
| 5,122,890 | 6/1992 | Makow ................................. 359/63 |
| 5,156,885 | 10/1992 | Budd . |
| 5,161,041 | 11/1992 | Abileah et al. . |
| 5,165,781 | 11/1992 | Oak . |
| 5,188,760 | 2/1993 | Hikmet et al. . |
| 5,211,878 | 5/1993 | Reiffenrath et al. . |
| 5,228,879 | 7/1993 | Fromm . |
| 5,235,443 | 8/1993 | Barnik et al. . |
| 5,247,190 | 9/1993 | Friend et al. . |
| 5,260,827 | 11/1993 | Diekan . |
| 5,269,995 | 12/1993 | Ramanathan et al. . |
| 5,294,657 | 3/1994 | Melendy et al. . |
| 5,316,703 | 5/1994 | Schrenk . |
| 5,319,478 | 6/1994 | Fijnfschilling et al. . |
| 5,337,224 | 8/1994 | Field et al. . |
| 5,389,324 | 2/1995 | Lewis et al. . |
| 5,409,783 | 4/1995 | Tang . |
| 5,418,062 | 5/1995 | Budd . |
| 5,439,705 | 8/1995 | Budd . |
| 5,448,404 | 9/1995 | Schrenk et al. . |
| 5,469,019 | 11/1995 | Mori . |
| 5,486,935 | 1/1996 | Kalmanash . |
| 5,486,949 | 1/1996 | Schrenk et al. . |
| 5,491,377 | 2/1996 | Janusauskas . |
| 5,508,585 | 4/1996 | Butt . |
| 5,554,450 | 9/1996 | Shi et al. . |
| 5,593,782 | 1/1997 | Budd . |
| 5,598,059 | 1/1997 | Sun et al. . |
| 5,612,820 | 3/1997 | Schrenk et al. . |
| 5,629,055 | 5/1997 | Revol et al. . |
| 5,686,979 | 11/1997 | Weber et al. . |
| 5,721,603 | 2/1998 | De Vaan et al. . |
| 5,744,534 | 4/1998 | Ishiharada et al. . |
| 5,751,388 | 5/1998 | Larson . |
| 5,767,935 | 6/1998 | Ueda et al. . |
| 5,770,306 | 6/1998 | Suzuki et al. . |
| 5,783,120 | 7/1998 | Ouderkirk et al. . |
| 5,793,456 | 8/1998 | Broer et al. . |
| 5,808,794 | 9/1998 | Weber et al. . |
| 5,825,542 | 10/1998 | Cobb, Jr., et al. . |
| 5,825,543 | 10/1998 | Ouerkirk et al. . |

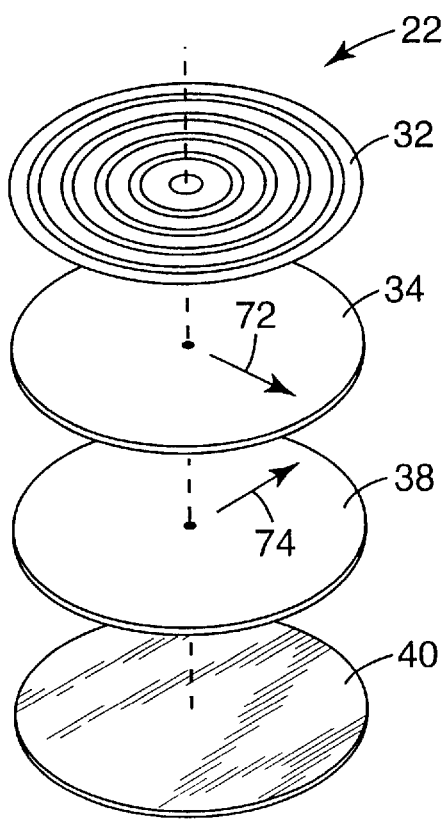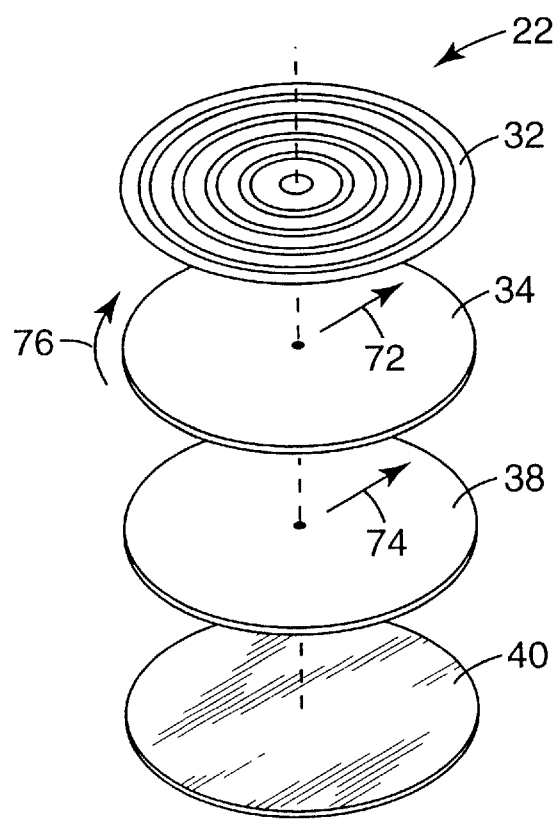
Fig. 5  Fig. 7
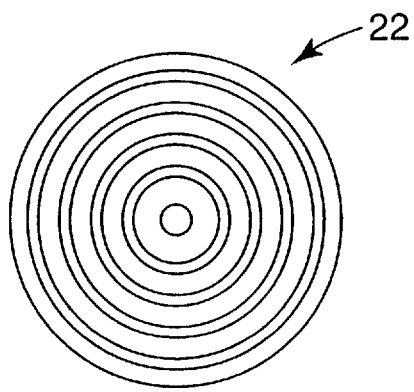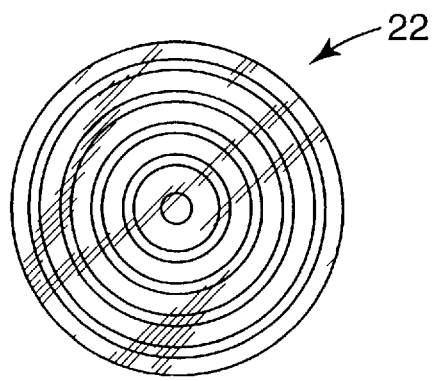
Fig. 6  Fig. 8

TOY HAVING IMAGE MODE AND CHANGED IMAGE MODE

FIELD OF THE INVENTION

The present invention relates to a toy or novelty article having a reflective, "mirror" mode and a transmissive mode, such that a generally opaque material is viewable therethrough in the transmissive mode.

BACKGROUND OF THE INVENTION

Toys or novelties often simulate real-life articles. In designing toys, consideration is given to make the toys as real as possible, while making them suitable for play, for example, by a child.

SUMMARY OF THE INVENTION

The present invention provides a toy or novelty article comprising a generally opaque material, a first polarizer and a second polarizer, wherein the first polarizer is movable relative to the second polarizer from a first orientation to a second orientation. In the first orientation, the first and second polarizers interact to be reflective. In the second orientation, the first and second polarizers are translucent (including transparent) such that the generally opaque material is viewable therethrough.

Optionally, the second polarizer has a fixed position relative to the generally opaque material. The toy or novelty may further comprise a housing, wherein the second polarizer may have a fixed position relative to the housing. In one exemplary embodiment, the first polarizer is rotatable relative to the second polarizer, preferably rotatable through a range of at least about 90° (and/or 270°) relative to the second polarizer. The toy may further include a generally translucent sheet material including at least one of an image therein or thereon, wherein the first polarizer and the second polarizer are positioned between the generally translucent sheet material and the generally opaque material. The image is viewable in the first orientation or the second orientation. The first polarizer may be immediately adjacent the second polarizer, wherein the first polarizer is located between the generally translucent material and the second polarizer.

Optionally, a mechanism is operably coupled to the first polarizer such that the first polarizer is movable relative to the second polarizer so that the toy may be moved from the first orientation to the second orientation. Further, the mechanism may include a gear box for movement of the first polarizer relative to the second polarizer from a remote location. When the toy is in the first orientation, the polarizing direction of the first polarizer is substantially perpendicular to the polarizing direction of the second polarizer, and when the mechanism is operated to move the toy to the second mode, the polarizing direction of the first polarizer is in substantial alignment with the polarizing direction of the second polarizer. In one embodiment, the mechanism is operated to rotate the first polarizer relative to the second polarizer through a range of at least about 90° (and/or 270°).

The generally opaque material may be a colored sheet material, preferably, a brightly colored sheet material. Optionally, the generally opaque material is partially transmissive. Further, a light source may be located below the generally opaque material. In one exemplary embodiment, the light source includes an electroluminscent sheet device (or lamp), which in use, is coupled to a power source. Optionally, the generally opaque material may be an electroluminescent device.

In another aspect, the present invention provides a toy (e.g., a toy stove or grill), which comprises a first polarizer, a second polarizer, a light source, an optional oscillatable (including rotatable) flame element, and an optional oscillation mechanism for oscillating the flame element. The first polarizer is movable from a first orientation to a second orientation relative to the second polarizer. The flame element is preferably located between the second polarizer and the light source. The first and second polarizers collectively interact to be reflective when the first and second polarizers are in the first orientation. When the first and second polarizers are in the second orientation, the first and second polarizers are transmissive, such that light from the light source and, if present, the flame element, is viewable therethrough. In some preferred embodiments, the toy includes more than one flame element. The flame element is configured and arranged to simulate flames. For example, the flame element(s) oscillate (e.g., rotate) such that the intensity of light from the light source (as viewed from the top of the stove or grill) varies to simulating flickering of a flame(s). Optionally, there is a tinted (e.g., orange, red, or a combination thereof) translucent material (e.g., a sheet material) which filters the light and thus enhances the simulated flame effect. Such translucent material can be, for example, a separate element and/or it can be part of the flame element. If there are multiple flame elements present, their oscillations can be arranged or varied to enhance the desired flame effect. For example, a first flame element can be rotatable in a first direction, and the second flame element rotatable in a second direction, opposite the first direction.

BRIEF DESCRIPTION OF THE DRAWING

The accompanying drawing is included to provide a further understanding of the present invention and is incorporated in and constitutes a part of this specification. The drawing illustrates exemplary embodiments of the present invention and together with the description serve to further explain the principles of the invention. Other aspects of the present invention and many of the attendant advantages of the present invention will be readily appreciated as the same becomes better understood by reference to the following Detailed Description when considered in connection with the accompanying drawing figures, and wherein:

FIG. 5 is a perspective view illustrating an exemplary embodiment of movement of a toy (or novelty) in accordance with the present invention in a first mode;

FIG. 6 is a top view of the illustration of FIG. 5;

FIG. 7 is a perspective view illustrating an exemplary embodiment of movement of a toy (or novelty) in accordance with the present invention in a second mode;

FIG. 8 is a top view of the illustration of FIG. 7;

DETAILED DESCRIPTION

Figure 1:
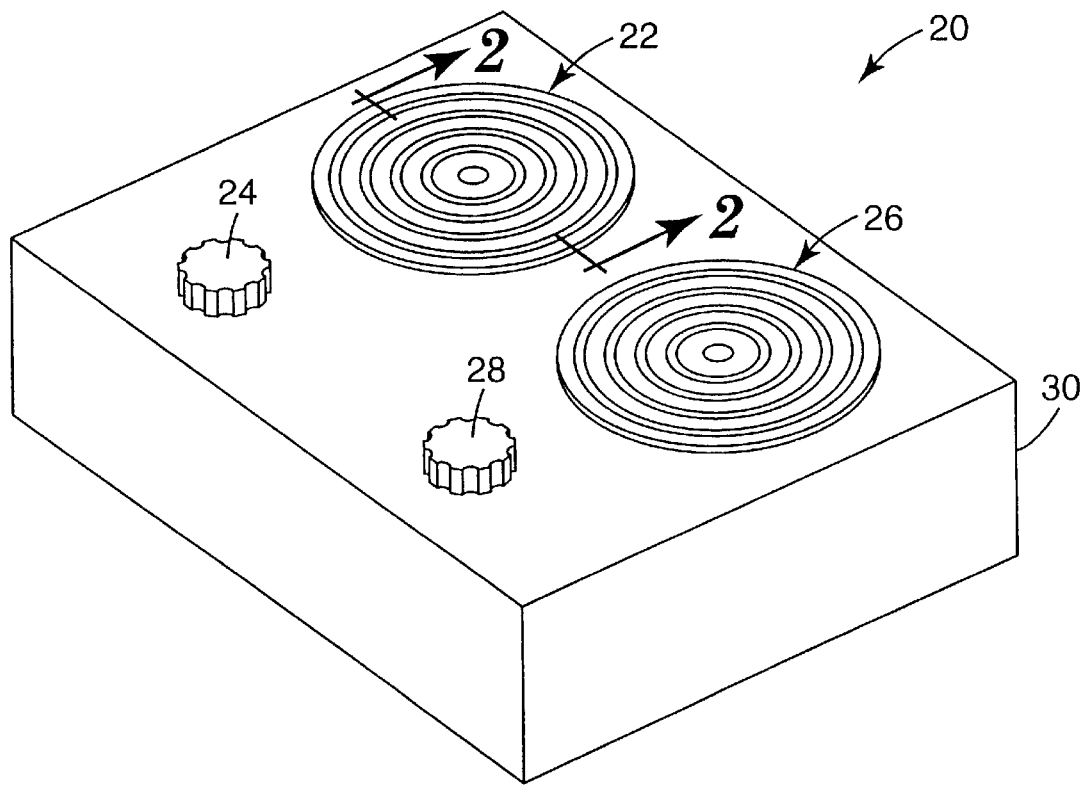
FIG. 1 is a perspective view illustrating an exemplary toy (or novelty) in accordance with the present invention.

Referring to FIG. 1, exemplary toy (or novelty) in accordance with the present invention 20 includes a first, image mode and a second, image mode different from the first image mode. In the first mode, toy 20 has an image in front of a mirror. In the changed image mode, toy 20 operates to show a changed image. More specifically, toy 20 is a toy stove, which includes first toy burner assembly 22, first operating mechanism 24, second toy burner assembly 26, second operating mechanism 28, and frame 30. First burner assembly 22, first operating mechanism 24, second burner assembly 26, and second operating mechanism 28 are operably coupled to frame 30. Second burner assembly 26 and second operating mechanism 28 can be similar to first burner assembly 22 and first operating mechanism 24. Although only first burner assembly 22 and first operating mechanism 24 will be discussed in detail herein, it is recognized that second burner assembly 26 and second operating mechanism 28 can be similar to first burner assembly 22 and first operating mechanism 24.

Mechanism 24 may be operated for changing first burner assembly 22 from a first image mode to a second changed image mode. In one particular embodiment, the first image mode simulates burner assembly 22 not in use. In the changed image mode, burner assembly 22 turns, for example, red or orange, simulating a heated burner.

Figure 2:
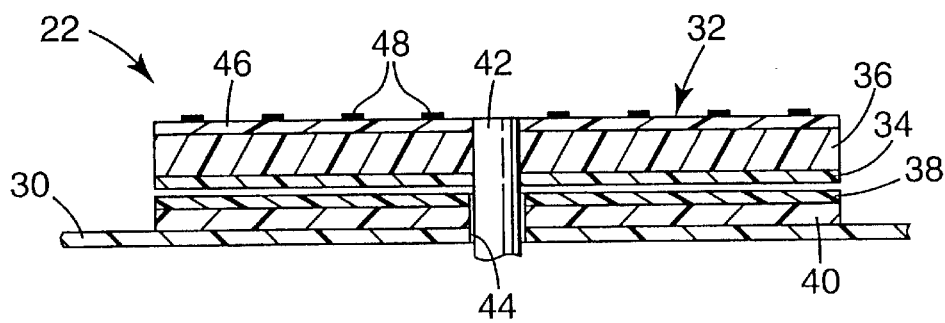
FIG. 2 is a cross-sectional view taken along line 2—2 of FIG. 1.

Referring to FIG. 2, which is a cross-sectional view of first burner assembly 22, taken along line 2—2 of FIG. 1, first burner assembly 22 includes image layer 32, first polarizer 34, support substrate 36, second polarizer 38, and opaque material 40. First burner assembly 22 further includes center shaft 42 disposed through center hole 44. As shown, center shaft 42 operates to move image layer 32, first polarizer 34, and support substrate 36 relative to second polarizer 38, opaque material 40, and frame 30.

Further, as shown, image layer 32, first polarizer 34, support substrate 36, second polarizer 38, and opaque material 40 are generally disc shaped. Support substrate 36 is fixedly attached to center shaft 42. Support substrate 36 is preferably a translucent material, for example, a clear or transparent rigid plastic material. First polarizer 34 is secured to support substrate 36. In one embodiment, first polarizer 34 is secured to support substrate 36 at its outer edge, for example, using an adhesive material (e.g., a high bond adhesive), although other attachment mechanisms may be apparent to one skilled in the art after reading this disclosure. Similarly, image layer 32 is attached to support substrate 36, for example, using an adhesive material, although other attachment mechanisms may be apparent to one skilled in the art after reading this disclosure. Preferably, first polarizer 34 is positioned immediately adjacent second polarizer 38.

Opaque material 40 is fixedly secured to frame 30. Second polarizer 38 is secured to opaque material 40. In one embodiment, opaque material 40 is secured to frame 30 using an adhesive material, and second polarizer 38 is secured to opaque material 40 about its outer edge using, for example, a clear adhesive material, although other attachment mechanisms may be apparent to one skilled in the art after reading this disclosure. In one preferred embodiment, opaque material 40 is brightly colored, and is optionally partially transmissive. Optionally, opaque material 40 can be an electroluminescent sheet device.

Center hole 44 is centrally disposed through second polarizer 38 and opaque material 40. As such, center shaft 42 extends through second polarizer 38 and opaque material 40, and is mechanically coupled to support substrate 36. Further, support substrate 36, first polarizer 34 and image layer 32 may be rotated relative to second polarizer 38 and opaque material 40. In particular, center shaft 42 may be utilized for rotating first polarizer 34 relative to second polarizer 38.

Image layer 32 can be, for example, a transparent polymeric material 46 (e.g., a conventional overhead transparency). Viewable image 48 is printed onto transparent polymeric material 46 using, for example, conventional printing techniques, such as laser printing. It is also recognized that viewable image 48 may be contained within transparent polymeric material 46. In the embodiment shown, viewable image 48 represents coils of a burner. Optionally, viewable image 48 may be printed on to first polarizer 34.

In another aspect, opaque material 40 can be, for example, a sheet of colored opaque polymeric material, preferably, a brightly colored material. A suitable opaque material is commercially available as a vinyl tape, for example, under the trade designation "3M SCOTCH BRAND 471" from the 3M Company of St. Paul, Minn. Optionally, instead of separate opaque material 40, second polarizer 48 could be a colored polarizer (e.g., a colorant or other opaque material can be added to the polarizer material).

In one embodiment according to the present invention, first polarizer 34 and/or second polarizer 38 is/are a multi-layer optical film having optical characteristics which allow them to interact to be in either a reflective mode and a translucent mode.

First polarizer 34 has a first polarizing direction and second polarizer 38 has a second polarizing direction. In one aspect, first polarizer 34 can be rotated relative to second polarizer 38 until a desired degree of reflectivity is achieved for moving toy 20 between an image mode and a changed image mode. A first polarizer 34 is rotated relative to second polarizer 38 through a range of 360 degrees, first polarizer 34 and second polarizer 38 collectively interact to change between a transmissive mode and a reflective mode. When the first polarizing direction is in alignment with the second polarizing direction (i.e., first polarizing direction is rotated 0 degrees from second polarizing direction) or when first polarizing direction is rotated 180 degrees from second polarizing direction, first polarizer 34 and second polarizer 38 collectively interact to be transmissive. When the first polarizing direction is rotated 90 degrees or 270 degrees from the second polarizing direction, first polarizer 34 and second polarizer 38 collectively interact to be reflective. As first polarizer 34 and second polarizer 38 move from a transmissive mode to a reflective mode, they change from being more transmissive to being more reflective.

Any of a variety of ways may be employed for moving toy 20 between the image mode and the changed image mode, including rotating first polarizer 34 relative to second polarizer 38, for example, by mechanical means, electrical means or a combination of both. Other suitable ways may be apparent to those skilled in the art after reviewing the disclosure of the present invention.

Figure 3:
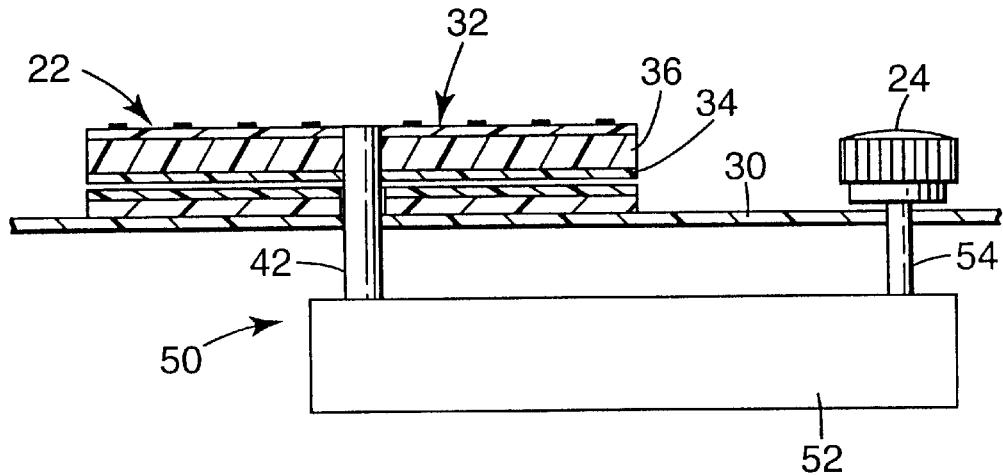
FIG. 3 is a diagram illustrating an exemplary embodiment of a mechanism for operating a toy (or novelty) in accordance with the present invention.

Referring to FIG. 3, one exemplary embodiment of mechanical operation of a burner assembly in accordance with the present invention is burner assembly 22 having mechanism 50 for rotating first polarizer 34 relative to second polarizer 38. Mechanism 50 includes gear box 52 and shaft 54, wherein gear box 52 is mechanically coupled to center shaft 42 and shaft 54. At an opposite end, shaft 54 is coupled to first operating mechanism 24. As shown, first operating mechanism 24 is a knob. In operation, by rotating first operating mechanism 24, first polarizer 34 is rotated relative to second polarizer 38. The rotational movement of first operating mechanism 24 is translated along shaft 54 through gear box 52, which in turn, rotates center shaft 42 for rotational movement of image layer 32, first polarizer 34, and support substrate 36.

Figure 4:
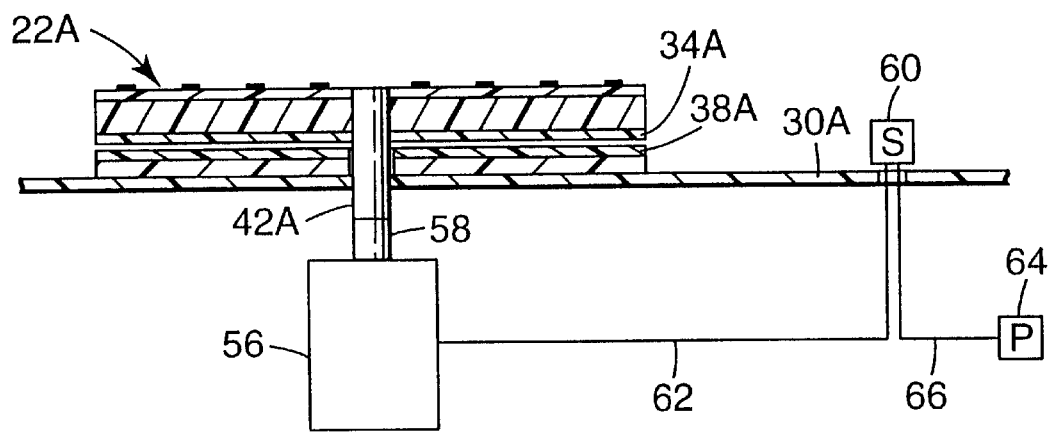
FIG. 4 is a diagram illustrating another exemplary embodiment of a mechanism for operating a toy (or novelty) in accordance with the present invention.

Referring to FIG. 4, one exemplary embodiment of electrical operation of a burner assembly in accordance with the present invention is burner assembly 22A having center shaft 42A coupled to motor 56 through motor shaft 58. Motor 56 is electrically coupled to switch 60, indicated at 62. Switch 60 is coupled to power source 64 indicated at 66. By operation switch 60, motor 56 is selectively energized for rotating center shaft 42A, and as such, rotating first polarizer 34A relative to second polarizer 38A.

Referring to FIG. 5, a diagram illustrating operation of burner assembly 22 in an image mode is shown. Image layer 32, first polarizer 34, second polarizer 38 and opaque material 40 are in optical alignment along center axis 70 (support substrate 36 is not shown for clarity). First polarizer 34 has a polarizing direction, indicated by arrow 72, and second polarizer 38 has a polarizing direction, indicated by arrow 74. In the image mode, polarizing direction 72 and polarizing direction 74 are not in alignment (or crossed) along center axis 70. In particular, polarizing direction 72 and polarizing direction 74 are substantially perpendicular, relative to the longitudinally extending center axis 70.

When polarizing direction 72 and polarizing direction 74 are not in alignment, first polarizer 34 and second polarizer 38 interact to operate as mirror. Referring to FIG. 6, a top view of burner assembly 22 of FIG. 5 is shown, wherein only image layer 32 is viewable. Opaque material 40 is not viewable through first polarizer 34 and second polarizer 38.

Referring to FIG. 7, a perspective view illustrating the position of first polarizer 34 relative to second polarizer 38 in a changed image mode is shown, as indicated by rotational arrow 76. First polarizer 34 has been rotated approximately 90° relative to second polarizer 38, such that polarizing direction 72 is now in alignment with polarizing direction 74. In reference to FIG. 8, a top view of burner assembly 22 of FIG. 7 is shown, wherein polarizing direction 72 is in alignment with second polarizing direction 74, such that opaque material 40 is viewable through image layer 32, first polarizer 34 and second polarizer 38. In one preferred embodiment, opaque material 40 is fluorescent red, to give the appearance of a hot burner.

Figure 9:
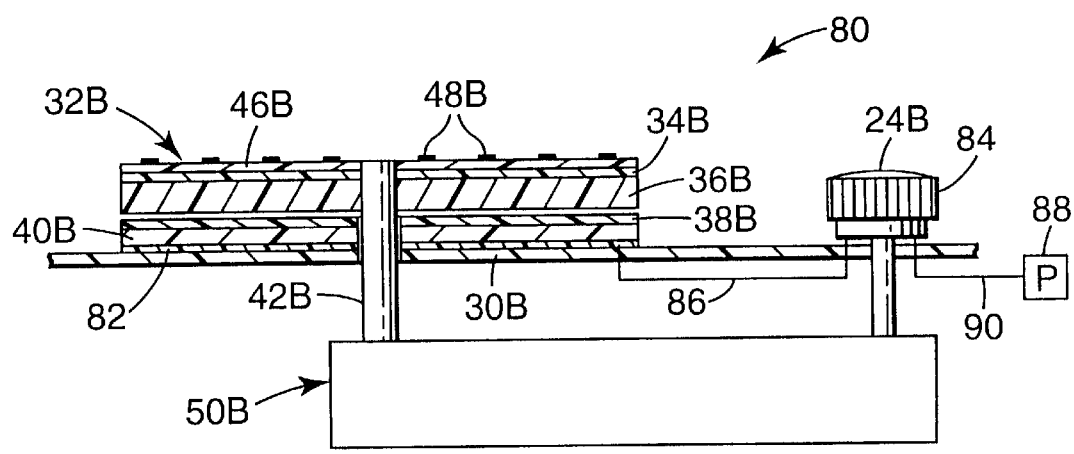
FIG. 9 is a cross-sectional view illustrating another exemplary embodiment of a toy in accordance with the present invention.

Referring to FIG. 9, a cross-sectional view illustrating another exemplary embodiment of a toy in accordance with the present invention is shown at 80. Toy 80, which is similar to toy 20 as previously described herein, includes frame 30B, image layer 32B (including transparent polymeric material 46B and viewable image 48B), first polarizer 34B, support substrate 36B, second polarizer 38B, rotating center shaft 42B, mechanism 50B, light source 82 located adjacent translucent (including transparent) material 40B. In one preferred embodiment, opaque material 40B is partially transmissive, and light source 82 is an electroluminesent sheet device. Operating mechanism 24B includes a switch mechanism 84. Light source 82 is coupled to switch 84, indicated at 86. Switch 84 is coupled to power source 88 (e.g., a DC power source coupled to an inverter) indicated at 90. Optionally, opaque material 40B is an electroluminescent sheet device.

"Electroluminescent sheet devices" (also referred to as "electroluminescent (sheet) lamps") as used herein, which in contrast to a point light source (including a light emitting diode), have an extended light emitting surface area (i.e., at least 1 cm$^2$, typically at least 2 cm$^2$, at least 5 cm$^2$, or greater) which typically provides uniform light emission from the surface. Typically, such a device has a length and a width that are much greater than its thickness (i.e., at least 10 times; typically at least 25 times, more typically, at least 100 times, greater than the thickness of the devices). Suitable electroluminescent sheet devices (or lamps) are known in the art, and rely on the electroluminescence of a light emitting material (e.g., phosphor material, organic light emitter (e.g., a triphenyldiamine derivative (TPD), poly phenylene vinylene (PPV), quinolinol metal complex (Alq), or the like (e.g., Mn-doped ZnS, alkaline earth thiogallates (e.g., $CaGa_2S_4$)))) in the presence of an electric field, wherein the phosphor (or the like) becomes excited and emits photons. Most of the radiated energy falls within the visible range of the spectrum.

Generally, an electroluminescent sheet device is electrically similar to a capacitor and comprises a dielectric layer comprising light-emitting phosphor (or the like) sandwiched between two electrically conductive layers. At least one additional dielectric layer may also be present. The primary purpose of the additional dielectric layer is to allow the electroluminescent material (i.e., the phosphors material or the like) to withstand higher voltages without shorting between the conductive surfaces. Electroluminescent devices illuminate when powered with an applied voltage. Suitable electroluminescent devices as known in the art are energized using an alternating current (AC) voltage. As voltage is applied to the conductive surfaces, an electric field is generated across the phosphor (or other material) and dielectric layers. Electrons are excited from the valance band into the conduction band or injected into the conduction band of the luminescent material. Many of these excited electrons decay to lower energy states with the emission of light. Emitted light passes through a transparent front electrode (of the device) as they return to their ground states. Preferably, electroluminescent sheet devices utilized in the practice of the present invention are flat or planer. Typically, electroluminescent sheet devices have a thickness in the range from about 0.05 mm to about 20 mm, more typically, about 0.1 to about 5 mm, depending, for example, on the type of device and substrate.

Generally, there are at least three types of electroluminescent sheet devices, which are sometimes referred to as "organic thin film-type" (small molecule-types (see, e.g., U.S. Pat. Nos. 4,356,429 (Tang), 5,409,783 (Tang) 5,554, 450 (Shi et al.)) and "conjugated polymer-type" (see, e.g., U.S. Pat. No. 5,247,190 (Friend et al.)); "inorganic thin film-type" (see, e.g., U.S. Pat. No. 5,598,059 (Sun et al.)); and inorganic particles (or thick film)-type (see, e.g., U.S. Pat. Nos. 5,469,019 (Mori), 5,508,585 (Butt), 5,156,885 (Budd), 5,418,062 (Budd), 5,439,705 (Budd), 5,491,377 (Janusaukas), and 5,593,782 (Budd)). The disclosures of U.S. Pat. Nos. 5,156,885 (Budd), 5,418,062 (Budd), and 5,439,705 (Budd) are incorporated herein by reference.

Electroluminescent devices can be tailored through the use, for example, of different compositions and/or filters to provide a variety of colors (e.g., violet, blue, blue-green, orange, white, orange-yellow, yellow, and red). Unlike filament or fluorescent lamps, electroluminescent devices do not fail catastrophically or abruptly fail, but rather the brightness of the lamp gradually decreases over long periods of time. The characteristics of the degradation behavior can vary with the different types of electroluminescent devices and materials. Electroluminescent lamp life is typically affected by voltage, frequency, temperature, oxygen, and humidity. Humidity is typically highly detrimental to the luminescent materials in all types of lamps, unless such effect is controlled. Techniques for protecting the lamp material from the effects of humidity are known in the art, and particularly prevalent for the commercially available lamps. Thin film types are generally fabricated on glass substrates, and are protected on the non-light emitting side by metal or other inorganic coatings. Organic types are generally sealed with a second sheet of glass. Thick film particulate type lamps are particularly advantageous because there are currently robust lamps which do not require a glass substrate. Moisture protection is achieved by macroencapsulating the entire lamp structure with sheets of a low permeability polymer (such as that available under the trade designation "ACLAR" from Allied Chemical), or by microencapsulating the particulate phosphor material in a moisture resistant or proof material, such as oxide materials (e.g., titania, alumina, and silica) (see, e.g., U.S. Pat. Nos. 5,156,885 (Budd), 5,418,062 (Budd), 5,439,705 (Budd), and 5,593,782 (Budd), the disclosures of which were incorporated herein by reference above).

Particulate electroluminescent phosphors, for example, are most commonly used in thick film constructions. These devices typically include a layer of an organic dielectric matrix (e.g. polyester, polyethylene terephthalate, cellulosic materials, etc.), preferably having a high dielectric constant, loaded with phosphor particles (e.g., sulfide-based phosphor particles). Such layers are typically coated on a plastic substrate having a transparent front electrode. A rear electrode (e.g., an aluminum foil or screen printed silver ink) is typically applied to the back side of the phosphor layer. When an electric field is applied across the electrodes, the proximate portions of the layer emit light as the phosphor particles therein are excited. Such constructions may further comprise optional dielectric layers between the phosphor layer and rear electrodes.

One preferred electroluminescent (thick film) device comprises, in order, a first electrode, a layer of dielectric matrix loaded with encapsulated electroluminescent phosphor particles, and a rear electrode, wherein the encapsulated phosphor particles each comprise a particle of zinc sulfide-based electroluminescent phosphor which is essentially completely encapsulated within a substantially transparent, continuous metal oxide precursors, and wherein the encapsulated phosphor particles have an initial electroluminescent brightness which is equal to or greater than about 50 percent of the initial electroluminescent brightness of the uncoated phosphor particle, and the percent of electroluminescent brightness retained by the encapsulated phosphor particles following 100 hours operation in an environment having a relative humidity of at least 95 percent is greater that about 70 percent of the intrinsic brightness retained following 100 hours operation, the initial brightness and change in electroluminescent brightness in an environment having a relative humidity of at least 95 percent and intrinsic brightness change being measured under substantially the same operating conditions (for further details, see U.S. Pat. No. 5,593,782 (Budd), the disclosure of which was incorporated herein by reference above).

Preferably, the electroluminescent material (e.g., phosphor) is encapsulated to reduce, minimize, or prevent the effects of moisture or humidity on the life of the device (see, e.g., U.S. Pat. Nos. 5,156,885 (Budd), 5,418,062 (Budd), 5,439,705 (Budd), and 5,593,782 (Budd), the disclosures of which were incorporated herein by reference above). A commercially available phosphor electroluminescent device, which utilizes encapsulated inorganic particles is available, for example, from Durel Corp. of Chandler, Ariz., under the trade designation "DUREL 3 EL".

Other electroluminescent devices which may be suitable in the practice of the present invention are available, for example, form NEC Corporation of Tokyo, Japan and (under the trade designation "PERMA-LIGHT") from Quantex of Rockville, Md.

In operation, burner assembly 80 is in a first image mode, such that first polarizer 34B and second polarizer 38B interact to be reflective, and only image 48B may be viewed. Upon operation of mechanism 24B, first polarizer 34B is rotated approximately 90° relative to second polarizer 38B, allowing opaque material 40B to be viewed therethrough. Additionally, as mechanism 24B is operated, switch 84 electrically couples electroluminescent sheet device 83 to power source 88, for activation or energization of electroluminescent sheet device. Electroluminescent sheet device 82 may be used for enhancing the viewability of opaque material 40B through burner assembly 80.

Figure 10:
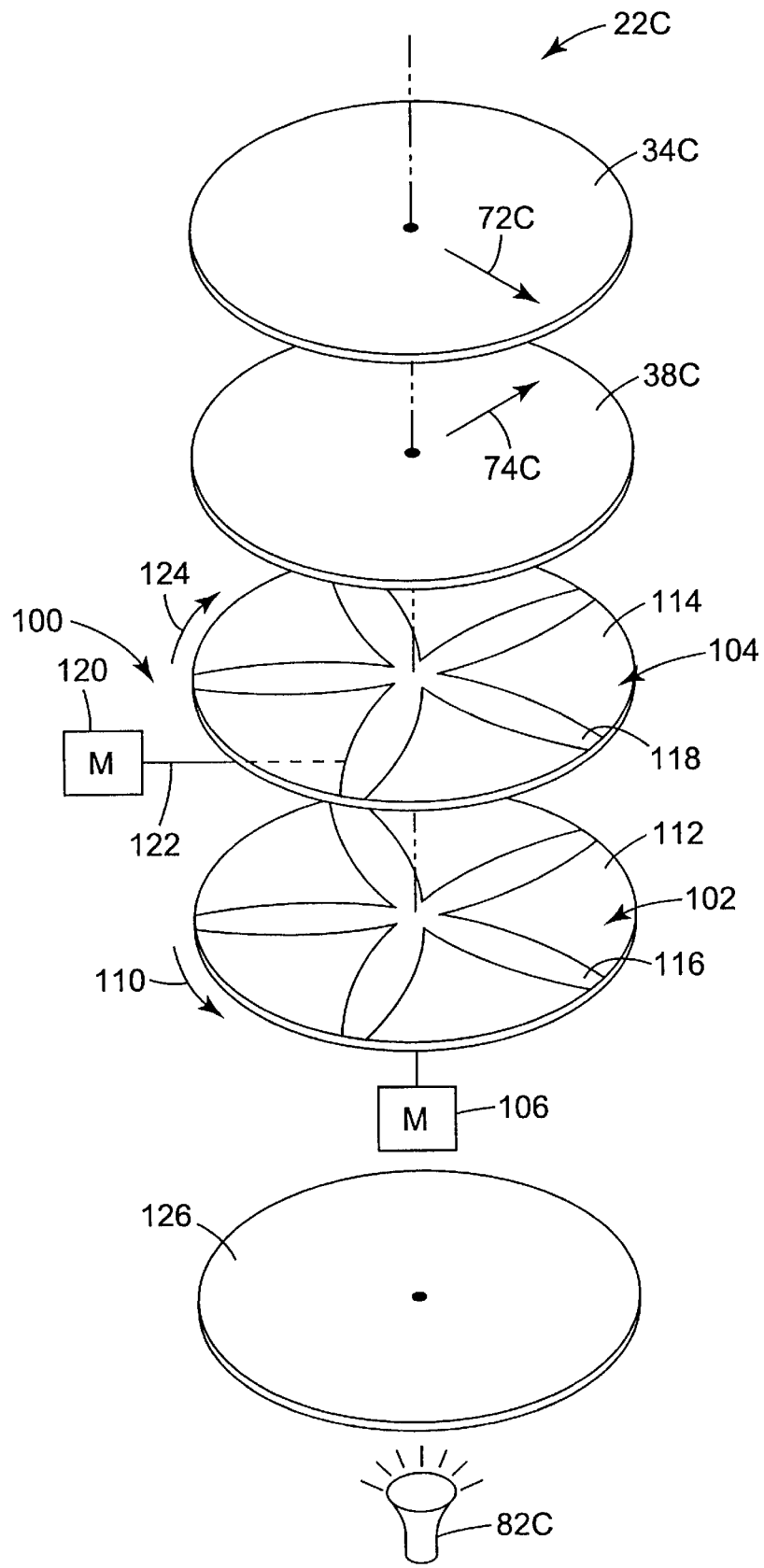
FIG. 10 is a perspective view illustrating another exemplary embodiment of a toy in accordance with the present invention.

Referring to FIG. 10 another exemplary embodiment of a toy burner assembly 22C for use with a toy stove in accordance with the present invention is shown. Burner assembly 22C includes flame mechanism 100, positioned between second polarizer 38C and light source 82C, to simulate a gas stove burner assembly. The light source can be, for example, an incandescent light bulb or the like (e.g., a halogen lamp). Typically, the light source emits visible (i.e., electromagnetic radiation having one or more wavelengths in the range from about $4 \times 10^{-7}$ m to $7 \times 10^{-7}$ m).

Preferably, flame mechanism 100 includes first flame element 102 and flame element 104. First flame element 102 is mechanically coupled to motor 106 at mechanical linkage 108, for rotation about axis 109 in a first direction, indicated by directional arrow 110. Flame element 102 and flame element 104 each comprise a generally transparent substrate 112, 114 having patterns 116, 118 printed thereon.

In the exemplary embodiment shown in FIG. 10, patterns 116, 118 are in the shape of fan blades. In operation, motor 106 operates to rotate flame element 102 in first direction 110 relative to second flame element 104, during energization of light source 82C. When first polarizing direction 72C is positioned in alignment with second polarizing direction 74C, first polarizer 34C and second polarizer 38C operate in a transmissive mode as previously described herein. In the transmissive mode, light source 82C and flame mechanism 100 are viewable through first polarizer 34C and second polarizer 38C to give the appearance of a glowing flame.

Optionally, motor 120 may be mechanically coupled to second flame element 104 through mechanical linkage 122 for rotation of second flame element 104 about axis 109 in second direction 124. Second flame element 104 is rotated in second direction 124 which is opposite the rotational direction of first flame element 102, first direction 110, to further enhance the appearance of burner assembly 22C as having a gas flame. Optionally, for example, light filter 126 may be positioned between flame mechanism 100 and light source 82C (e.g., red, orange, yellow, etc., or combinations thereof (e.g., patches of different colors)) to further enhance burner assembly 22C. Further, or alternatively, in operation, the size and arrangement of flame mechanism 100, light source 82C, and filter 126, as well as the speed and direction of rotation of flame elements 102, 104 can be selected to provide a desired effect.

Figure 11:
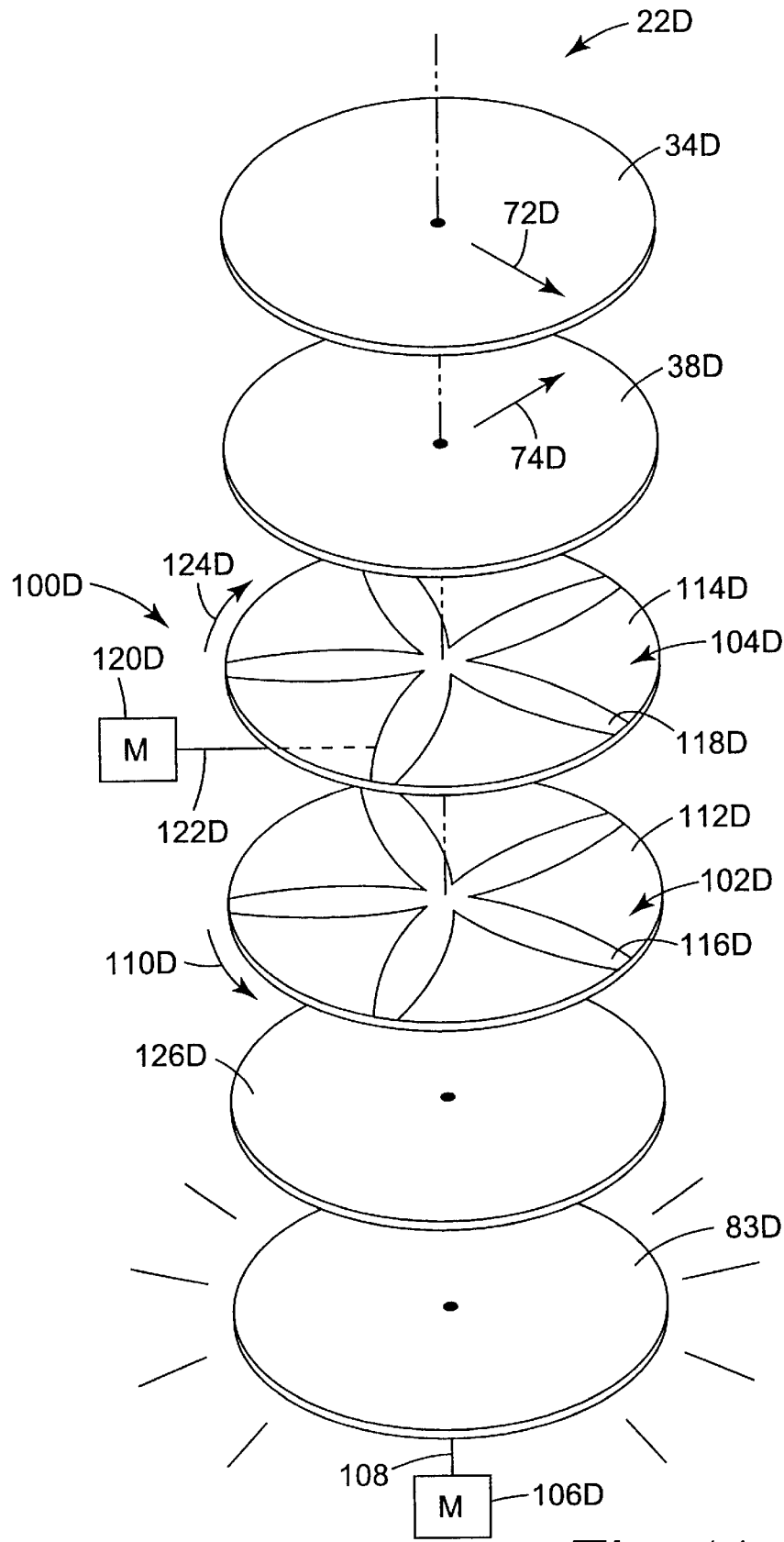
FIG. 11 is a perspective view illustrating another exemplary embodiment of a toy in accordance with the present invention.

Referring to FIG. 11, another exemplary embodiment of a burner assembly 22D for use in a toy in accordance with the present invention to simulate a gas stove is shown. Optionally, it is recognized, for example, that the light source may comprise electroluminescent sheet device 83D. As such, mechanical linkage 108 may extend through electroluminescent sheet device 83D and diffuser 126D for rotation of flame element 102D by motor 106D 106D. Further, as shown, burner assembly 22D has first polarizer 34D, first polarizing direction 72D, second polarizer 38D, second polarizing direction 74D, flame mechanism 100D, second flame element 104D, first direction 110D, generally transparent substrate 112D, 114D having patterns 116D, 118D printed thereon, motor 120D, mechanical linkage 122D, and second direction 124D.

Polarizers for use in the present invention include dichropic polarizers and multilayer optical films (see, e.g., U.S. Pat. Nos. 5,486,949 (Schrenk et al.) and 5,612,820 (Schrenk et al.), the disclosures of which are incorporated herein by reference). Preferred polarizers for use in the present invention can be constructed with a multilayer optical film which transmit a significant amount of light having one plane of polarization while reflecting a significant amount of light having an orthogonally oriented polarization. Such multilayer optical films exhibit relatively low absorption of incident light, as well as high reflectivity for off-axis as well as normal light rays. Further, the relative percentages of transmitted/reflected light can be largely controlled by the multilayer optical film used.

Suitable birefringent optical film polarizers for practicing the present invention are also commercially available, for example, under the trade designation "DUAL BRIGHTNESS ENHANCEMENT FILM" from the 3M Company of St. Paul, Minn.

Preferred polarizers for practicing the present invention are birefringent optical films constructed of multilayer stacks for which the Brewster angle (the angle at which reflectance of p-polarized light goes to zero) is very large or is nonexistent. This allows for the construction of multilayer polarizers whose reflectivity for p-polarized light decreases slowly with angle of incidence, are independent of angle of incidence, or increase with angle of incidence away from the normal. As a result, multilayer films having high reflectivity for the selected direction over a wide bandwidth, can be achieved.

Such film can be used to prepare multilayer films having an average reflectivity of at least 50% over at least a 100 nm wide band.

Preferred polarizer film for use in the present invention are described in applications having U.S. Ser. Nos. 08/402,041, filed Mar. 10, 1995; 08/494,366, filed Jun. 26, 1995; and 09/006,601, filed Jan. 13, 1998 which are incorporated herein by reference.

Various process considerations are important in making high quality optical films (including polarizers). The process conditions used to make the film will depend in part on the particular resin system used and the desired optical properties of the final film. The following description is intended as an overview of those process considerations common to many resin systems used in making the coextruded optical films useful for the present invention.

Material Selection

Regarding the materials from which the films are to be made, there are several conditions which must be met that are common to certain preferred multilayer optical films for use in the present invention. First, such films comprise at least two distinguishable polymers. The number is not limited, and three or more polymers may be advantageously used in particular films. Second, one of the two required polymers, referred to as the "first polymer", must have a stress optical coefficient having a large absolute value. In other words, it must be capable of developing a large birefringence when stretched. Depending on the application, this birefringence may be developed between two orthogonal directions in the plane of the film, between one or more in-plane directions and the direction perpendicular to the film plane, or a combination of these. Third, the first polymer must be capable of maintaining this birefringence after stretching, so that the desired optical properties are imparted to the finished film. Fourth, the other required polymer, referred to as the "second polymer", must be chosen so that in the finished film, its refractive index, in at least one direction, differs significantly from the index of refraction of the first polymer in the same direction. Because polymeric materials are dispersive, that is, the refractive indices vary with wavelength, these conditions must be considered in terms of a spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may be chosen so that, after processing, its refractive index will match that of the first polymer in either the stretching direction or the planar direction orthogonal to stretching. Further, the second polymer will be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative-positive or positive-negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and levels of orientation for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films useful for the present invention. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyetheramides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from the lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a coPEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/"ESTER," and PET/"ESTER," where "coPEN" refers to a copolymer or blend based upon naphthalene dicarboxylic acid (as described above) and "ESTER" refers to is a polyester or copolyester (believed to comprise cyclohexanedimethylene diol units and terephthalate units) commercially available under the trade designation "ESTER" from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Preferred multi-component constructions are described in copending application having U.S. Ser. No. 09/006,118, filed Jan. 13, 1998, the disclosure of which is incorporated by reference.

Detailed process considerations and additional layers are included in copending application having U.S. Ser. No. 09/006,288, filed Jan. 13, 1998, the disclosure of which is incorporated by reference.

Other suitable polarizing materials may be apparent to those skilled in the art after reviewing the disclosure of the present invention.

Many adhesive materials may be used to laminate optical films and devices to another film, surface, or substrate. Such adhesive materials include pressure sensitive adhesives, hot-melt adhesives, solvent-coated adhesives, heat activated adhesives and the like. These adhesive materials preferably are optically clear, diffuse and exhibit non-hazy and non-whitening aging characteristics. Furthermore, the adhesive materials should exhibit long term stability under high heat and humidity conditions. Suitable adhesive materials may include solvent, heat, or radiation activated adhesive systems. Pressure sensitive adhesive materials are normally tacky at room temperature and can be adhered to a surface by application of light to moderate pressure.

Examples of adhesive materials, whether pressure sensitive or not and useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, adhesive materials can contain additives such as tackifiers, plasticizers, fillers, antioxidants, stabilizers, diffusing particles, curatives, and solvents, provided they do not interfere with the optical characteristics of the devices. When additives are used they are used in quantities that are consistent with their intended use and when used to laminate an optical film to another surface, the adhesive composition and thickness are preferably selected so as not to interfere with the optical properties of the optical film. For example, when laminating additional layers to an optical film or device wherein a high degree of transmission is desired, the laminating adhesive material should be optically clear in the wavelength region that the optical film or device is designed to be transparent in.

Further, the surface(s) on which an adhesive material is applied or otherwise attached to may be primed (e.g., chemically, physical (e.g., physical treatment such as roughening), and corona) to affect the degree of attachment between the adhesive material and surface.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A toy comprising:

a generally opaque material;

a first polarizer and a second polarizer, said first polarizer movable from a first orientation to a second orientation relative to said second polarizer; and wherein said first and second polarizers collectively interact to be reflective when said first and second polarizers are in said first orientation, and when said first and second polarizers are in said second orientation, said first and second polarizers are transmissive, such that said generally opaque material is viewable therethrough.

2. The toy of claim 1, wherein in said second orientation, said first and second polarizers are transparent.

3. The toy of claim 1, wherein said second polarizer has a fixed position relative to said generally opaque material.

4. The toy of claim 1, further comprising a housing, wherein said second polarizer has a fixed position relative to said housing.

5. The toy of claim 1, wherein said first polarizer is rotatable relative to said second polarizer.

6. The toy of claim 5, wherein said first polarizer is rotatable through a range of at least about 90° relative to said second polarizer.

7. The toy of claim 1, further comprising a generally translucent sheet material including at least one of an image therein or thereon, wherein said first and second polarizers are positioned between said translucent sheet material and said opaque material.

8. The toy of claim 7, wherein said image is copyrightable material.

9. The toy of claim 7, wherein said image is in the shape of a trademark.

10. The toy of claim 7, wherein said generally translucent sheet material is transparent.

11. The toy of claim 7, wherein said image is viewable in said first orientation and said second orientation.

12. The toy of claim 7, wherein said first polarizer is immediately adjacent to said second polarizer, and wherein said first polarizer is located between said generally translucent material and said second polarizer.

13. The toy of claim 1, further comprising a mechanism operably coupled to said first polarizer for moving said first polarizer relative to said second polarizer to change said toy between said first orientation and said second orientation.

14. The toy of claim 10, wherein said mechanism includes a gear box for movement of said first polarizer relative to said second polarizer from a remote location.

15. The toy of claim 1, wherein said opaque material is an electroluminescent sheet device.

16. A toy having a reflective mirror mode and a transmissive mode, said toy comprising:

a toy frame;

a generally translucent sheet material including at least one of an image therein or thereon;

a first polarizer including a polarizing direction;

a second polarizer having a polarizing direction, wherein said first polarizer is movable relative to said second polarizer from a first orientation to a second orientation, and such that in said first orientation said first and second polarizers interact to be in said reflective mirror mode, and in said second orientation said first and second polarizers are in said light transmissive mode; and a generally opaque material having a fixed position relative to said second polarizer;

wherein said first and second polarizers are located between said generally translucent sheet material and said generally opaque material, and wherein said generally opaque material is viewable in said light transmissive mode.

17. The toy of claim 16, further wherein said image is viewable in said reflective mirror mode or said light transmissive mode.

18. The toy of claim 16, wherein said generally opaque material is orange or red.

19. The toy of claim 16, wherein said image is viewable through said generally translucent sheet material when said toy is in said light transmissive mode.

20. The toy of claim 16, further comprising a mechanism for moving said first polarizer relative to said second polarizer such that said first polarizer is movable relative to said second polarizer to change said toy between said reflective mirror mode and said light transmissive mode.

21. The toy of claim 16, wherein said first polarizer is rotatable relative to said second polarizer.

22. The toy of claim 21, wherein said first polarizer is rotatable relative to said second polarizer through a range of at least about 90°.

23. The toy of claim 16, wherein when said toy is in said reflective mirror mode, said first polarizer's polarizing direction is substantially perpendicular to said second polarizer's polarizing direction.

24. The toy of claim 16, wherein said generally opaque material is at least partially transmissive, and further comprising a light source located below said generally opaque material.

25. The toy of claim 24, wherein said light source includes an electroluminescent sheet device and power source.

26. The toy of claim 16, wherein said opaque material is an electroluminescent sheet device.

27. The toy of claim 16, wherein said image includes copyrightable material.

28. The toy of claim 16, wherein said image includes at least one trademark.

29. The toy of claim 16, wherein said image includes at least one registered trademark.

30. The toy of claim 16, further comprising a stand mechanically coupled to said frame.

31. A method of operating a toy, said method comprising the steps of:

providing a generally opaque material;

providing a first polarizer and a second polarizer;

moving said first polarizer relative to said second polarizer from a first orientation to a second orientation, such that in said first orientation, said first and second polarizers interact to be reflective, and in a said second orientation, said first and second polarizers are translucent such that said generally opaque material is viewable therethrough.

32. The method of claim 31, further comprising the step of providing a mechanism for moving said fist polarizer relative to said second polarizer.

33. The method of claim 31, wherein the step of moving said first polarizer relative to said second polarizer includes rotating said first polarizer relative to said second polarizer.

34. The method of claim 33, wherein said first polarizer is rotated through a range of at least about 90° relative to said second polarizer.

35. The method of claim 31, further comprising the step of providing a generally translucent sheet material including at least one of an image therein or thereon.

36. The method of claim 35, further comprising the step of positioning said first and second polarizers between said generally translucent sheet material and said generally opaque material.

37. A toy comprising:
   a first polarizer and a second polarizer, said first polarizer movable from a first orientation to a second orientation relative to said second polarizer;
   a light source; and
   a flame simulation mechanism located between said second polarizer and said light source;
wherein said first and second polarizers collectively interact to be reflective when said first and second polarizers are in said first orientation, and when said first and second polarizers are in said second orientation said first and second polarizers are collectively transmissive, such that said flame simulation mechanism is viewable therethrough.

38. The toy of claim 37, wherein said flame simulation mechanism further comprises:
   a first flame simulation element having a pattern thereon, said first flame simulation element rotatable in said first direction; and
   a second flame simulation element having a pattern thereon, said second simulation flame element rotatable in a second direction opposite said first direction.

39. The toy of claim 37, wherein said light source includes an electroluminescent sheet device.

* * * * *

UNITED STATES PATENT AND TRADEMARK OFFICE
CERTIFICATE OF CORRECTION

PATENT NO. : 6,053,795
DATED : April 25, 2000
INVENTOR(S) : Whitney et al.

It is certified that error appears in the above-identified patent and that said Letters Patent is hereby corrected as shown below:

Col. 9, Line 8, delete "106D", second instance

Col. 17, Line 57, "including" should read --having--

Signed and Sealed this

Fifth Day of June, 2001

*Attest:*

*Attesting Officer*

NICHOLAS P. GODICI

*Acting Director of the United States Patent and Trademark Office*